United States Patent
Alvi

(10) Patent No.: US 8,664,781 B2
(45) Date of Patent: Mar. 4, 2014

(54) TUNNEL POWER TURBINE SYSTEM TO GENERATE POTENTIAL ENERGY FROM WASTE KINETIC ENERGY

(76) Inventor: Mujeeb Ur Rehman Alvi, Karachi (PK)

(*) Notice: Subject to any disclaimer, the term of this patent is extended or adjusted under 35 U.S.C. 154(b) by 195 days.

(21) Appl. No.: 13/066,540

(22) Filed: Apr. 15, 2011

(65) Prior Publication Data

US 2011/0266802 A1  Nov. 3, 2011

(30) Foreign Application Priority Data

Apr. 15, 2010 (PK) .................................. 0312/2010

(51) Int. Cl.
*F02B 63/04* (2006.01)
*F03G 7/08* (2006.01)

(52) U.S. Cl.
USPC .......................................... 290/1 R; 290/43

(58) Field of Classification Search
USPC ............... 290/1 R, 43, 54; 415/3.1; 166/66.5, 166/65.1, 248; 366/165.1, 165.2, 174.1, 366/175.2; 60/398, 698
See application file for complete search history.

(56) References Cited

U.S. PATENT DOCUMENTS

| | | | |
|---|---|---|---|
| 4,122,675 A * | 10/1978 | Polyak | 327/28 |
| 5,464,320 A * | 11/1995 | Finney | 415/60 |
| 5,680,032 A * | 10/1997 | Pena | 290/52 |
| 2005/0042095 A1* | 2/2005 | Kaliski | 416/88 |
| 2007/0130929 A1* | 6/2007 | Khan et al. | 60/398 |
| 2008/0067813 A1* | 3/2008 | Baarman et al. | 290/43 |
| 2009/0022588 A1* | 1/2009 | Chen | 415/218.1 |
| 2009/0088060 A1* | 4/2009 | Arnold et al. | 454/4 |
| 2009/0295164 A1* | 12/2009 | Grabau et al. | 290/55 |
| 2009/0322095 A1* | 12/2009 | Mazur | 290/55 |
| 2010/0207388 A1* | 8/2010 | Nyffenegger | 290/43 |
| 2010/0207389 A1* | 8/2010 | Nyffenegger | 290/44 |
| 2010/0244453 A1* | 9/2010 | Dornan | 290/55 |
| 2011/0189006 A1* | 8/2011 | Churchill et al. | 415/207 |
| 2012/0175882 A1* | 7/2012 | Sterling et al. | 290/55 |
| 2012/0282092 A1* | 11/2012 | Swist | 416/1 |

* cited by examiner

*Primary Examiner* — Tulsidas C Patel
*Assistant Examiner* — Thomas Quigley
(74) *Attorney, Agent, or Firm* — Abelman, Frayne & Schwab

(57) ABSTRACT

A system for generating energy from waste includes a generator device and an ejector device integrated in a pipe line unit. The generator device includes nozzle venture inlets. The ejector device is coupled with the generator device and includes a slit venture outlet to restore any velocity pressure loss in the pipe line unit and eliminate any back pressure buildup in the generator device.

5 Claims, 6 Drawing Sheets

TUNNEL POWER TURBINE SYSTEM TO GENERATE POTENTIAL ENERGY FROM WASTE KINETIC ENERGY

BACKGROUND OF THE INVENTION

1: "Wind Turbines Farms":
  (a) The cardinal principal involved in Wind Turbines Power Generation; wherein a 20% increase in the wind velocity—increases the power generation by 73%, despite, AIR density decreases with temperature and altitude; "MAJOR FACTOR in POWER GENERATION is WIND VELOCITY$^3$".
  (b) Windmills cannot operate at 100% efficiency because the structure itself impedes the flow of the wind. The structure also exerts back pressure on the turbine blades as they act like an air foil (a wing on an airplane), the average efficiency of Wind Turbine is around 20%.
  (c) The basics of Wind Kinetic Energy; 'P' (Power KW) attainable is: 'P'=1/2pAV$^3$ i.e. 0.5×p (Mass Kg/m$^2$)×A (Fan Area-sq. meters)×V$^3$ (Velocity-meters per second$^3$)=KW.

2: "Hot Air Balloons":
Air Pressure Increase with Temperature—Hot air is less dense than cold air and therefore is buoyant and rises, it exerts Vertical Pressure to lift.

3: "Vertical Wind Tunnel":
"INDOOR SKYDIVING" enables human beings to FLY in air, through the FORCE of WIND being generated VERTICALLY. The cardinal PRINCIPAL of a TUNNEL is; "a 2$^{nd}$ PRESSURE known as STATIC PRESSURE is always present in a DUCT/TUNNEL/PIPE; it acts equally in all SIDES of the CONDUIT—independent of VELOCITY or its MOVEMENT DIRECTION".

4: "Wind Hopper":
Captures EXTERNAL WIND for Power Generation as disclosed by Mujeeb R. Alvi in Pakistan Patent No. 128764 issued 30 Nov. 1985 is generally known, but does not perform the function in the manner of this invention.

The above prior known art scientific principles are incorporated in the present invention, which is a Tunnel Power Turbine System That Generates Potential Energy From Useless Waste Kinetic Energy presently dissipated in the environment the world over.

The innovative invention is a unique green technology source of renewable energy, is more productive, less cumbersome, and less costly to build as compared to conventional renewable energy systems, for a number of reasons, discussed below.
  a) In conventional Wind Turbine Farms, the turbine towers are very high (80 meters or more) and very heavy (450 tons or more each) producing up to 3 MW of Energy, present invention eliminates the use of gigantic and extremely heavy high Towers and gets rid of logistics problems thereof—more difficult to produce, fabricate, transport and install. Wind turbines are economically efficient in windy areas only. The invention reduces logistics problems. In wind turbines, generation of electricity depends on highly variable factors, e.g., erratic wind velocity and direction, the average efficiency of wind farms is low—20%; and the structure itself impedes wind flow and also exerts back pressure on the turbine blades. In contrast, the present invention is free from such impediments, energy efficiency can reach 95%, and the system is immune to climatic effects.
  b) Solar power generation depends totally on the presence of sun light, and is thus affected by weather and climate and requires large land areas free of shade.
  c) Known cogeneration systems use waste heat to generate steam for power generation, and heats water for circulation, after shedding part of the heat. The remaining portion of the waste heat is lost into the environment.
    III. Waste Kinetic Energy Source; Presently World Over Dissipated into the Environment Our cities, which can be considered "heat islands," that emit useless heat (air/gas) as waste energy. Wasted heat is generated in high rise residences (kitchen, household devices, air conditioners, generators, chillers, heaters etc). Commercial activity, industries, power plants, etc (where ever heat, hot radiator air & flue etc exists) also waste heat. Further, high rise structures soaks-up/retains heat from the sun, commercial and intense traffic exhaust. The bigger the city, the larger the "heat island." For example, one manmade structure—Burj Khalifa, Dubai, which is presently the world's tallest high rise, emits enormous amounts of kinetic energy, scattered into the environment from 160 Floors, 828 meters (2,717 feet) high; one structure.

SUMMARY OF THE INVENTION

The present invention is a unique green technology defines as tunnel power turbine system that generates potential energy from waste kinetic energy. The present invention transforms the waste energy The present invention transforms the waste energy into "Potential Kinetic Energy". The system defined in the present invention explicitly utilizes HEAT (air/Gas) dissipated or discarded as useless Waste Energy in environment [(III) above]. It regains or reclaims and propelled from all HEAT emitting sources by means of ducts, tunnels, pipes, shrouds, etc., and compounded with external air or wind and hence increases the Volume and Velocity in the System. It inducts new function and purpose wherein discarded or useless Waste Energy dissipated in environment finds a novel Green Technology usage Source as "Potential Kinetic Energy" which drives the Generator installed in the tunnel, wherein; driving factor is Velocity$^3$. All the work is done without fuel usage and it generates Kilowatt Hours (KWh), totally free of emission; System is utterly unlike Hydro Power generation, and highly differs from conventional Wind Power generation.

The System's three Devices work individually and collectively both, wherein the volume and velocity of regained or reclaimed waste energy is propelled and compounded with more external air or wind which enhances its "Potential Velocity" governed by Windmill cardinal principal. Major factor in power generation is wind velocity$^3$ without fuel usage and greenhouse (carbon) emission increase in environment generates potential energy. The benefits of the present invention are as follows:
  1) Incorporates prior art known Scientific Principles (I above) in unique new System of Potential Energy Generation.
  2) Has an additional advantage of TUNNEL (static pressure) that gives Direction and velocity consistency that can be managed, controlled and regulated and is immune of inherent drawbacks present in conventional Systems (II above).
  3) Waste Energy is in-built in all heat emitting sources that abundantly exist and available everywhere around us and presently dissipated in air and environment world over (III—above), is free from climatic effects.

Innovative Features
The present invention has following innovative features:
1. The present "TUNNEL POWER TURBINE" is the only SYSTEM in the world that galvanizes, activates, incites and stimulates useless "WASTE ENERGY" presently dissipated or discarded into the environment from passive DORMANT STATE to GENERATE POTENTIAL ENERGY without FUEL USAGE or ENVIRONMENT POLLUTION or GREENHOUSE GAS (CARBON) EMISSION increase.

2. The "TUNNEL POWER TURBINE" System to GENERATE POTENTIAL ENERGY; is located where most useless WASTE KINETIC ENERGY originates and is discarded/dissipated in air as useless; but more vital ENERGY is demanded or required.

3. The "TUNNEL POWER TURBINE" is the only System in the world that integrates, encompasses, and incorporates all known scientific principles on which other different systems individually operate, as per below:—
    (a) "WIND TURBINES FARMS": "MAJOR FACTOR in POWER GENERATION is WIND VELOCITY$^3$".
    (b) "HOT AIR BALLOONS": "Hot air is less dense than cold air, therefore it is buoyant and rises, it exerts Vertical Pressure to lift."
    (c) "VERTICAL WIND TUNNEL": "a $2^{nd}$ PRESSURE known as STATIC PRESSURE is always present in a DUCT/TUNNEL/PIPE; it acts equally in all SIDES of the CONDUIT—independent of VELOCITY or its MOVEMENT DIRECTION".
    (d) "WIND HOPPER" "Captures EXTERNAL WIND for Power Generation" Pakistan Patent No. 128764 issued 30 Nov. 1985.

4. The three DEVICES of "TUNNEL POWER TURBINE System" to GENERATE POTENTIAL ENERGY from reclaimed, useless WASTE KINETIC ENERGY, are; (I) "TUNNEL POWER DEVICE" (internal DEVICE); (II) "SHROUDED FUNNEL DEVICE" (external DEVICE), and; (III) "TEMPERATURE DISPERSING DEVICE" (external DEVICE), have similar EJECTOR CONTRAPTION Mechanism, as a most vital component of the system while two COMPONENTS; (I) "TUNNEL POWER DEVICE" and (II) "SHROUDED FUNNEL DEVICE" have additional similar DEFUSER components. The function/operation of the respective DEVICES are identical as per below:—
    (i) The EJECTOR CONTRAPTION BODY component in all the three DEVICES I, II, and III is identical. The CONTRAPTION BODY is built and incorporated around the TUNNEL Body and has an inlet; a venture is concealed inside the Contraption Body and opens in TUNNEL passage; useless WASTE KINETIC ENERGY is inducted under pressure through the contraption body inlet—is SELF EJECTED with VELOCITY PRESSURE through the VENTURI into TUNNEL passage where it creates a VORTEX beyond the VENTURI outlet and creates a VACUUM below the VENTURI outlet and sucks more useless WASTE KINETIC ENERGY or EXTERNAL AIR as required through the TUNNEL passage opening below therein. The only difference is FLOW direction. FIGS. 1, 3 and 5.
    (ii) The DEFUSER component; in two DEVICES (I) and (II) the diffuser components are akin; the plates are erected vertically and fixed against the TUNNEL passage wall. The plate's edge is at an angle that faces the flow direction—effectually changes the VORTEX ROTATIONAL movement into LINEAR movement—accelerates LINEAR VELOCITY PRESSURE inside the TUNNEL passage—FIGS. 1 and 3.

5. The "SHROUDED FUNNEL" device has an additional feature wherein a LARGE HEMISPHERICAL DEVICE is installed or fitted on a vertical shaft that passes through the midpoint of the "SHROUDED FUNNEL INLETS", and connects a FAN below the "SHROUDED FUNNEL INLETS." WIND POWER from any direction rotates the hemispherical device above and the FAN below intensifies MOTION and PRESSURE of EXTERNAL WIND intake through all SHROUDED FUNNEL INLETS (see FIGS. 3 and 4).

The "TEMPERATURE DISPERSING DEVICE"; comprises of a number of casings; inducts cool through inlets between two casings; blends, disperses, and reduces the high temperature factor (Radiator HEATED AIR (75 degrees C.)+ EXHAUST FLUE (484 degrees C.)+cool air) and simultaneously heats inducted cool air, whereby it greatly increases the VOLUME and VELOCITY PRESSURE of WASTE KINETIC ENERGY output from device (III) for POTENTIAL ENERGY GENERATION—FIG. 5.

DETAILED DESCRIPTION OF THE INVENTION

The features, objects and advantages of the Invention will be fully understood from the following detailed description of accompanying drawings:

The "Tunnel Power Turbine System" waste energy (Gas) is buoyant and exerts Vertical Pressure. Whereof the System's Large Body 16 shrouds or envelops or holds "Tunnel Power Device" (I) (i.e., System's internal Device). Wherein an Ejector Contraption Body 3 is incorporated or built around the Tunnel Body 1 with an INLET 4 through which useless waste energy under velocity pressure is inducted in contraption body 3. Wherein, it is self-ejected through concealed Venturi 5 into Tunnel passage 2 which causes Vortex 10 beyond Venturi outlet 5 and creates Vacuum Cavity 11 below Venturi outlet 5 in Tunnel passage 2, draws/sucks more Waste Energy/External Air 6 through OPEN INLET 9 below Contraption Body 3. The diffuser Plates 7 are erected vertically against Tunnel passage 2 wall.

Diffuser Plates Angle edge 8 faces flow direction that changes Vortex Rotation movement into Linear movement increases Linear Velocity enters Unification Chamber 12 of System's Large Body 16 wherein; two additional external Inlets 13 and 14 connects System's Large Body 16 and receives auxiliary Waste Energy from two external Devices, a) Shrouded Funnel DEVICE through INLET 13 and b) Temperature Dispersing Device through INLET 14. Whereof, emerging Waste Kinetic Energy's from three Devices (Tunnel 2, Inlet 13 and Inlet 14) merge in Unification Chamber 12, increases geometrically. Composite waste kinetic energy under velocity VENTS from System's Unification Chamber 12 Outlet 15 thereof which drives the Generator installed in a Tunnel (see FIG. 1).

Figure 1:
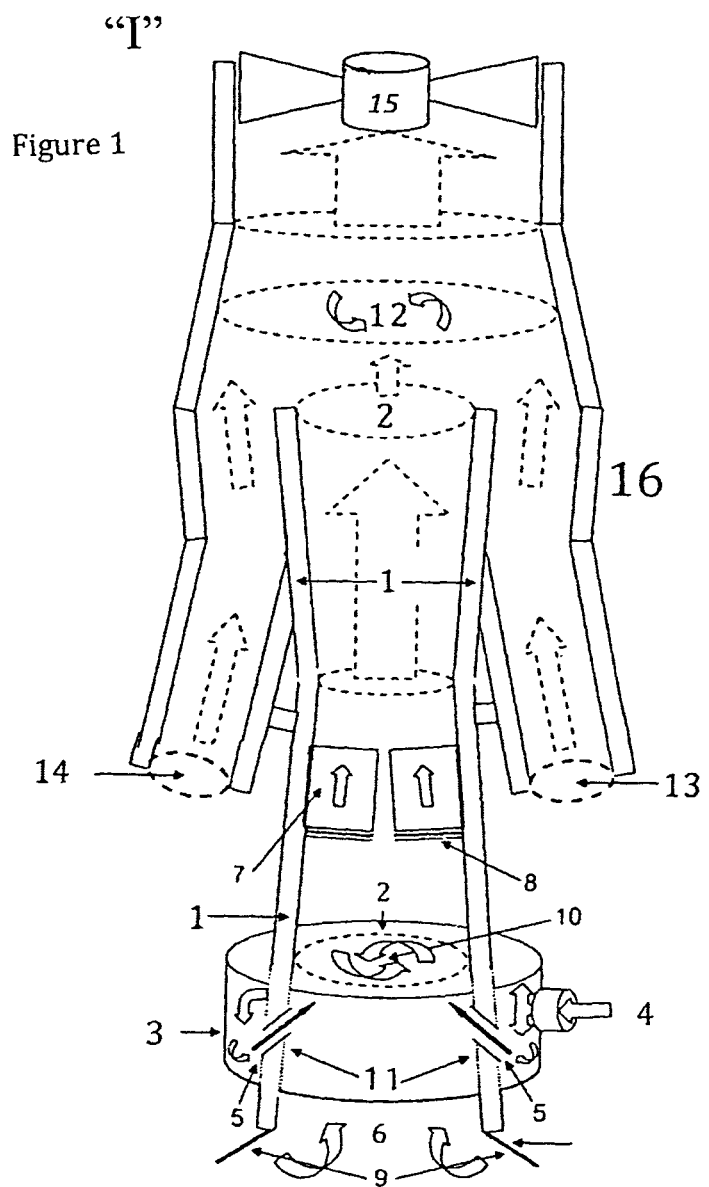
FIG. 1 is a cross section of a "tunnel power device" and large body forming part of the system according to the invention.
Figure 2:
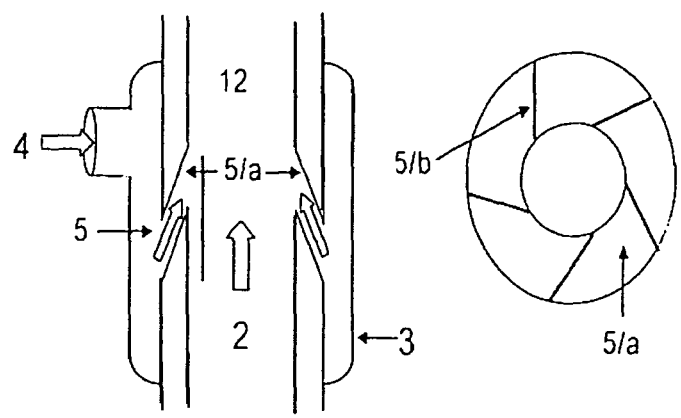
FIG. 2 is a perspective cross-sectional view of a venturi for use in the tunnel power device of FIG. 1.

The Venturi is concealed inside Ejector Contraption Body 3 while on Venturi Slope 5/*a* BARRIERS 5/*b* are fixed at an angle—regulates spiral magnitude of the Vortex 10 if, where and when as required (see FIG. 2 which is a cross section view of Venturi 5 FIG. 1).

Figure 3:
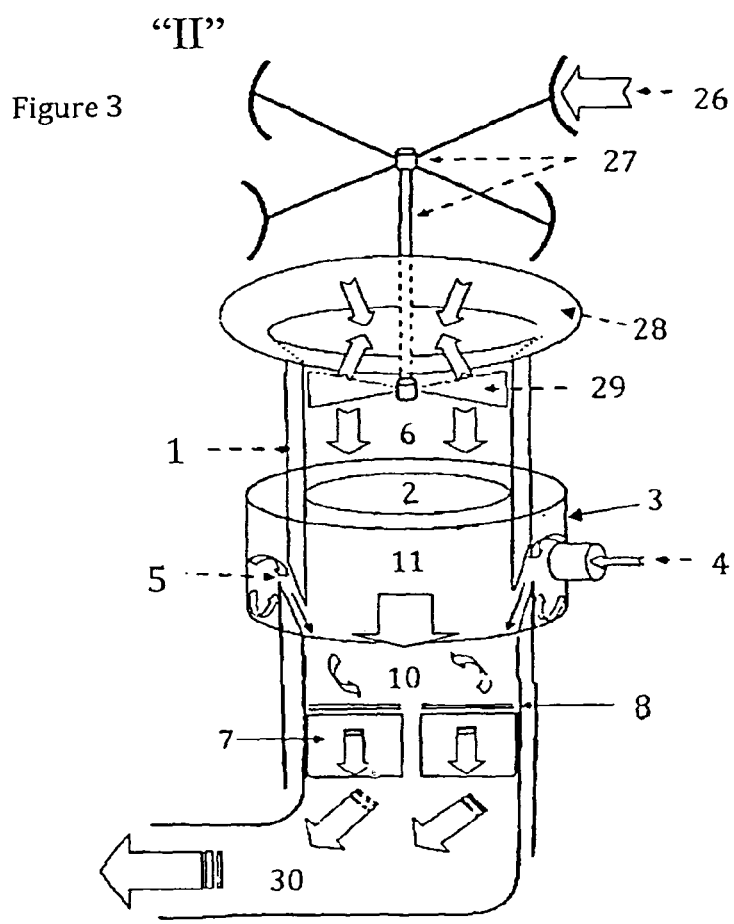
FIG. 3 is a cross-sectional view of a "shrouded funnel device" forming another part of the system according to the invention.
Figure 4:
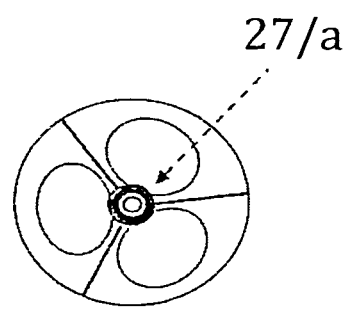
FIG. 4 is a perspective view of a shrouded funnel device midpoint.

The external "Shrouded Funnel Device" (II) has a similar Ejector Contraption Body and diffuser as in FIG. 1. An additional feature that is Hemispherical Rotating Device 26 is installed or fixed above a vertical shaft 27 passes through midpoint of Shrouded Funnel Device Inlets 28 and connects a FAN below Inlets 29; FIGS. 3 & 4; wherein it shows:

a Tunnel Body 1 wherein Ejector Contraption Body 3 is built and incorporated around the Tunnel Body 1 with an Inlet 4 through which discarded Waste Energy under pressure is induct into the Contraption Body 3 which is self-ejected through Ventur 5 opening in Tunnel passage 2, wherein it causes Vortex 10 beyond Venturi Outlet 5 and creates Vacuum Cavity 11 below Venturi Outlet 5 in the Tunnel passage 2 and sucks-in more External Air 6 through Shrouded Funnel Inlets 28. Diffuser Plates 7 are erected vertically/fixed against Tunnel passage wall. Diffuser Plates Angle edge 8 faces flow direction that changes Vortex Rotation movement into Linear movement which increases Linear Velocity of mixture to exit 30. Shrouded Funnel 28 has three or more Inlets. Vertical Driving Shaft 27 connects Hemispherical Cup Rotating Device 26 above and FAN 29 below Shrouded Funnel Inlets 28. Wind Power from any direction rotates the Hemispherical Cup Rotating Device 26 above and rotates FAN 29 below that increases Velocity of the sucked in external Wind/Air through Shrouded Funnel Inlets 28 [(see FIG. 3 which is the prospective view of external "Shrouded Funnel Device" (II).

The Shrouded Funnel Inlets have three or more equal AIR inlets and midpoint 27/*a* through which Vertical Driving Shaft 27 passes [see FIG. 4 which is a cross section view of the "Shrouded Funnel Inlets"].

Figure 5:
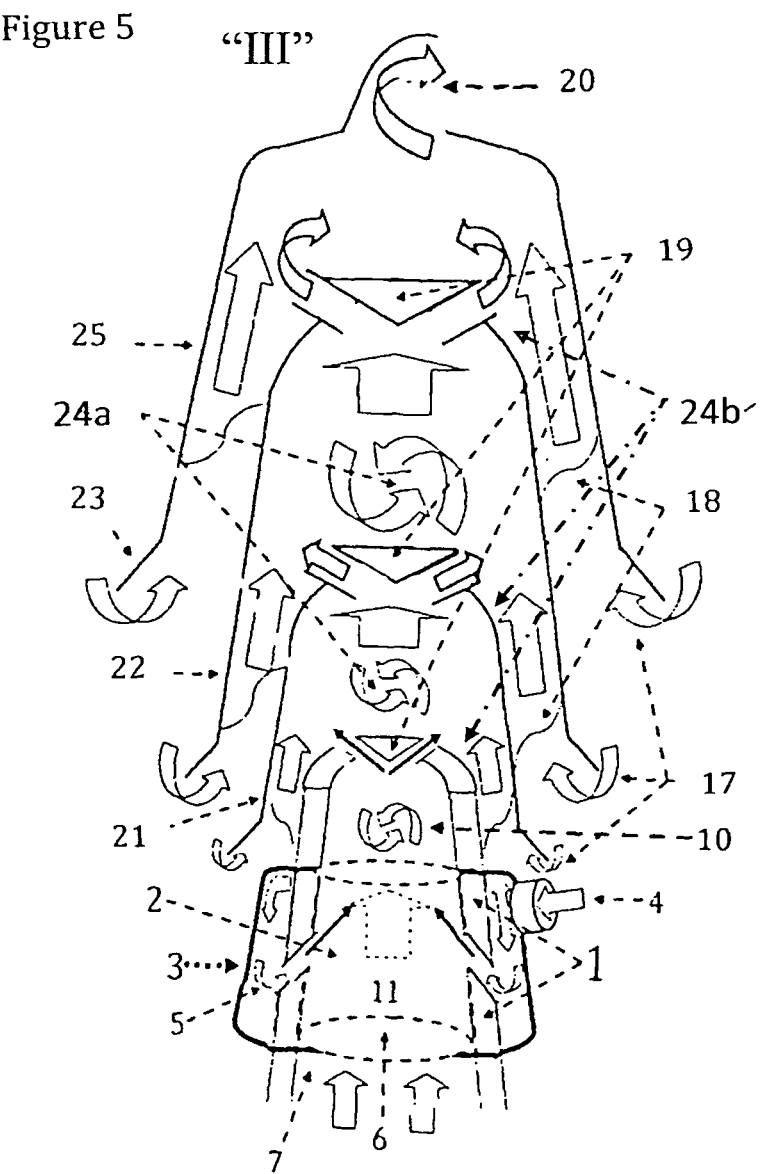
FIG. 5 is a cross-sectional view of a "temperature dispersing device" forming a third part of the system according to the invention.

The temperature dispersing device (III) has a similar Ejector Contraption with Venturi concealed therein. In addition, it has a number of Casings 21, 22 and 25 on top of each other with Venturi Outlets and Air Inlets between every Casing; wherein it shows:

Tunnel Body 1 as the first Casing of "Temperature Dispersing Device" wherein Ejector Contraption Body 3 built or incorporated around Tunnel Body 1 with Inlet 4 through which Blended {Radiator Heated Air (75° C.)+Exhaust Flue (484° C.)} under velocity pressure is inducted into the Contraption Body 3 which is Self-Ejected into Tunnel Passage 2 through Venturi 5 integrated in Tunnel Body concealed inside Contraption Body 3 wherein it causes Vortex 10 in the Tunnel Passage 2 beyond Venturi Outlet 5 and creates Vacuum Cavity 11 below the Venturi Outlet 5 in the Tunnel Passage 2 and sucks in External Cool Air 6 through Inlet opening below Tunnel Passage 2. Device casings 21, 22 and 25 are installed on top of each other where each device casing has a VENTURI 19, wherein; causes Vortex 24*a* and creates Vacuum Cavity 24*b* and sucks in more External Cool Air through Air Passage 17; each Device Casing has a Shrouded Air Inlet 23. Casings are separated by Strips 18 that holds in position and provides passage between each Device Casing for Cool Air Inlet Passage 17 blended/compounded Waste Kinetic Energy exits through Outlet 20 [see FIG. 5 which is a view of "Temperature Dispersing Device" (III).

Figure 6:
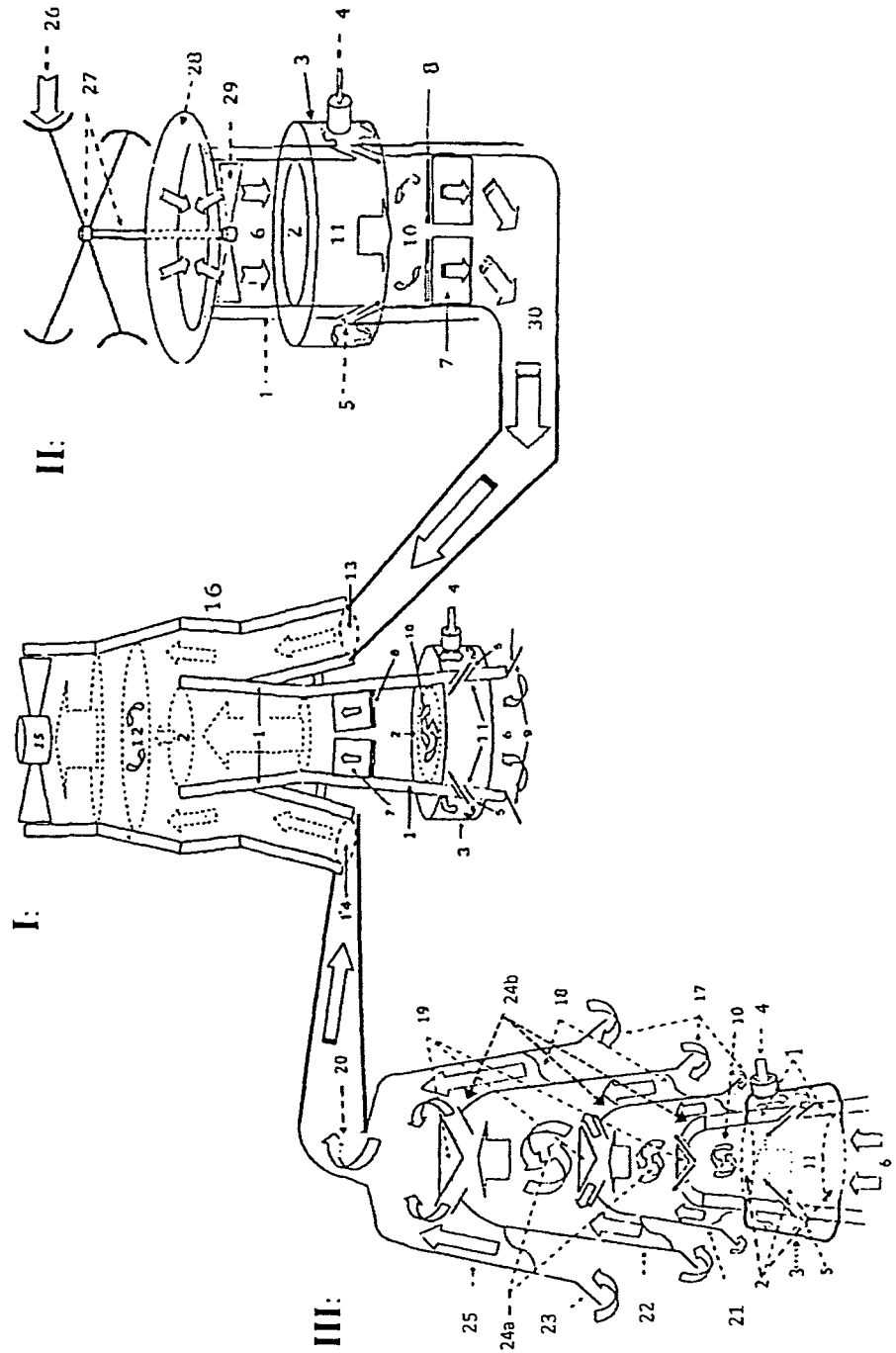

The system's three Devices i.e., a) internal "Tunnel Power Device" (I); b) external "Shrouded Funnel Device" (II); and external "Temperature Dispersing Device" (III) are aligned or arranged or linked or coupled or assembled together [see FIG. 6 which is a view of "Tunnel Power Turbine System"].

To avert any confusion, Ejector Contraption component in all Three Device; (I), (II) and (III) are similar; accordingly identical numbers are assigned (1, 2, 3, 4, 5, 6, 10 & 11) in respective drawings. Similarly, component diffuser is akin in Two Device (I) and (II); thus assigned numbers are also identical (7 & 8) in respective drawings.

I claim:

1. A system for recovering useful energy from waste heat comprising:

a tunnel power device having:
    a main outer tunnel having a main tunnel inlet and a main tunnel outlet;
    an inner tunnel having an inner tunnel inlet and an inner tunnel outlet, wherein said inner tunnel extends into said main tunnel inlet partially towards said main tunnel outlet, wherein said main outer tunnel defines a combining chamber located between said inner tunnel outlet and said main tunnel outlet;
    a first ejector contraption connected to said inner tunnel, wherein said first ejector contraption defines a first passage for providing communication between said inner tunnel inlet and said inner tunnel outlet; wherein said ejector contraption further includes a first inlet for permitting external air to enter said passage;
    at least one venturi for creating a vortex within said first passage in order to draw in additional external air through said inner tunnel inlet; and
a wind powered device disposed in said main outer tunnel which is powered by air flowing towards said main tunnel outlet;
a shrouded funnel device having a second ejector contraption having a second passage therethrough and a second inlet for permitting external air to enter said second passage; an inlet tunnel and outlet tunnel connected to opposite sides of said second passage; at least one venturi located to create a vortex within said second passage in order to draw additional external air into said inlet tunnel,
and a hemispherical cup device configured to drive a fan to increase the velocity of the air flowing through said second passage; and
a temperature control device comprising:
    a third ejector contraption with a first tunnel casing having a first tunnel casing outlet and a first tunnel casing inlet for permitting external air to enter an interior portion of said first tunnel casing;
    at least one venturi located to create a vortex within said interior portion in order to draw additional external air into said interior portion;
    a second casing disposed over said ejector contraption with a second casing inlet for permitting external air to enter said second casing and an outlet in the form of a second venturi outlet; wherein air emitted through said first tunnel casing outlet combines with air entering the second casing inlet and is ejected through said second venturi outlet;
wherein said temperature control device is suited for combining hot air in said first funnel casing with cooler air in the second casing for adjusting the temperature of the combined air; and
further comprising connectors for directing the outlets of the shrouded funnel device and temperature control device to at least one inlet of the tunnel power device communicating with said combining chamber;
wherein the wind powered device is configured to drive a generator to create energy from waste heat.

2. The system of claim 1, wherein said tunnel power device includes at least one diffuser element between said first ejector contraption and said main tunnel outlet.

3. The system of claim 1, wherein said shrouded funnel device includes at least one diffuser element between said second ejector contraption and an outlet of said outlet tunnel.

4. The system of claim 1, wherein said temperature control device includes a third casing disposed over said second casing with a third casing inlet and an outlet in the form of a third venturi outlet; wherein air emitted through said second casing outlet combines with air entering the third casing inlet and is ejected through said third venturi outlet.

5. The system of claim 4, wherein said temperature control device includes a fourth casing disposed over said second casing with a fourth casing inlet and an outlet in the form of a fourth venturi outlet; wherein air emitted through said third casing outlet combines with air entering the fourth casing inlet and is ejected through said fourth venturi outlet.

* * * * *